US010552566B2

(12) United States Patent
Park et al.

(10) Patent No.: US 10,552,566 B2
(45) Date of Patent: Feb. 4, 2020

(54) METHOD OF DESIGNING SEMICONDUCTOR DEVICE

(71) Applicant: Samsung Electronics Co., Ltd., Suwon-si, Gyeonggi-do (KR)

(72) Inventors: Jin Young Park, Uiwang-si (KR); Myung Jin Choi, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 120 days.

(21) Appl. No.: 15/692,291

(22) Filed: Aug. 31, 2017

(65) Prior Publication Data
US 2018/0089356 A1    Mar. 29, 2018

(30) Foreign Application Priority Data
Sep. 29, 2016   (KR) .................. 10-2016-0125720

(51) Int. Cl.
*G06F 17/50*      (2006.01)
(52) U.S. Cl.
CPC ........ *G06F 17/5072* (2013.01); *G06F 17/505* (2013.01); *G06F 17/5077* (2013.01); *G06F 17/5081* (2013.01); *G06F 2217/78* (2013.01); *G06F 2217/84* (2013.01)
(58) Field of Classification Search
CPC .............. G06F 17/5072; G06F 17/505; G06F 17/5077; G06F 17/5081; G06F 2217/78; G06F 2217/84
USPC ....... 716/119, 120, 122, 123, 127, 129, 130, 716/133, 134, 135; 703/16
See application file for complete search history.

(56) References Cited

U.S. PATENT DOCUMENTS

| 5,691,662 | A | * | 11/1997 | Soboleski | ................. G06F 1/10 327/292 |
| 6,092,211 | A | * | 7/2000 | Hozumi | .................... G06F 1/26 713/500 |
| 7,509,613 | B2 | | 3/2009 | Frenkil | |
| 7,755,396 | B2 | | 7/2010 | Shin et al. | |
| 7,911,231 | B2 | | 3/2011 | Yamashita | |
| 10,339,335 | B2 | * | 7/2019 | Sawada | ................. G06F 3/0623 |
| 2009/0172622 | A1 | * | 7/2009 | Pyapali | ............... G06F 17/5045 716/118 |
| 2010/0066439 | A1 | | 3/2010 | Caplan et al. | |
| 2010/0254202 | A1 | * | 10/2010 | Asauchi | ............. G06F 13/4291 365/189.17 |

(Continued)

FOREIGN PATENT DOCUMENTS

| JP | 09-027593 | 1/1997 |
| JP | 200949057 | 3/2009 |
| KR | 10-2016-0128678 | 11/2016 |

*Primary Examiner* — Phallaka Kik
(74) *Attorney, Agent, or Firm* — Harness, Dickey & Pierce, P.L.C.

(57) ABSTRACT

A method of designing a semiconductor device including a memory device, a buffer, and a plurality of head circuits connected to the buffer is disclosed. The method includes generating a layout pattern of a power line of the semiconductor device, generating an improved layout pattern of a pre-routing line that connects the buffer to the head circuits, and generating a layout pattern of signal lines of the semiconductor device. The signal lines include both normal signal lines and signal lines for a central clock of the semiconductor device. A layout of the semiconductor device includes a plurality of layers.

20 Claims, 13 Drawing Sheets

(56) References Cited

U.S. PATENT DOCUMENTS

2015/0098540 A1\* 4/2015 Priel .................. G06F 1/10
    375/356
2016/0006433 A1   1/2016 Ishizu et al.
2016/0203328 A1\* 7/2016 Sawada ............... G06F 21/85
    726/26

\* cited by examiner

METHOD OF DESIGNING SEMICONDUCTOR DEVICE

CROSS-REFERENCE TO RELATED APPLICATIONS

This application claims priority under 35 U.S.C. § 119(a) from Korean Patent Application No. 10-2016-0125720, filed on Sep. 29, 2016, the disclosure of which is hereby incorporated by reference in its entirety.

BACKGROUND

Example embodiments of inventive concepts relate to a method of designing a semiconductor device, and more particularly, to a method of designing a semiconductor device, which physically implements a power-gating circuit to which super cut-off and multi-fanout technology are applied.

A semiconductor device may be manufactured by patterning devices and mutual connections thereof on a substrate such as a semiconductor wafer. A semiconductor device may be manufactured through a process in which a designer designs an integrated circuit using electronic design automation (hereinafter referred to as "EDA"), which enables various circuit components to be placed to interact with each other and to be connected to each other. In other words, a layout designer may generate the layout of a semiconductor device using EDA.

The layout of a semiconductor device includes the physical locations and sizes of circuit components, connection wires, and various layers. The layout of a semiconductor device may be verified and transferred to a semiconductor substrate, and thus the semiconductor device may be manufactured.

In order to reduce the power consumption of such a semiconductor device, for example, a system-on-chip (hereinafter referred to as "SoC"), a power-gating circuit is used.

Further, in order to reduce leakage current that may occur in a power cut-off switch even in a sleep mode, technology for supplying a memory voltage having a relatively stable and high value to a PMOS transistor that forms a power cut-off switch has been proposed. This technology is hereinafter referred to as "super cut-off technology".

Furthermore, a semiconductor device having a multi-fanout structure, in which a single control circuit controls a plurality of header cells, has been proposed so as to reduce and/or minimize leakage current and effectively use physical resources.

However, as the size of semiconductor devices has become smaller, in a semiconductor device to which the above-described multi-fanout and super cut-off technology are applied, limiting and/or preventing a max transition time violation (MTTV) problem, wiring congestion problem, and a gate oxide breakdown caused by an antenna effect may be an issue.

SUMMARY

According to some example embodiments of inventive concepts, there a method of designing a semiconductor device including a memory device, a buffer, and a plurality of head circuits connected to the buffer is provided. The method includes generating a layout pattern of a power line of the semiconductor device, generating an improved layout pattern of a pre-routing line that connects the buffer to the plurality of head circuits, and generating a layout pattern of signal lines of the semiconductor device. The signal lines include normal signal lines and signal lines for a central clock related to a response time for determining performance of the semiconductor device. A layout of the semiconductor device includes a plurality of layers.

According to other example embodiments of inventive concepts, a method of designing a semiconductor device using an electronic design automation (EDA) tool is provided. The method includes generating an improved layout pattern of a pre-routing line before generating a layout pattern of signal lines. The signal lines include normal signal lines and signal lines for a central clock related to a response time for determining performance of the semiconductor device. The semiconductor device includes a plurality of head circuits and a buffer for controlling operations of the head circuits. The pre-routing line connects the buffer to the head circuits.

According to other example embodiments of inventive concepts, a method of designing a semiconductor device using an electronic design automation (EDA) tool is provided. The layout of the semiconductor device includes a plurality of layers. The plurality of layer include a memory device, a buffer, and a plurality of head circuits connected to the buffer is provided. The method includes generating a layout pattern of a power line of the semiconductor device, generating an improved layout pattern of a pre-routing line that connects the buffer to the plurality of head circuits, generating a layout pattern of a pre-routing line connect the buffer to the plurality of head circuit, performing a clock tree synthesis operation that includes generating signal lines for a central clock related to a response time for determining performance of the semiconductor device, and performing a routing operation that includes generating a layout pattern of normal signal lines in the layout of the semiconductor device after the generating the improved layout pattern of the pre-routing line.

BRIEF DESCRIPTION OF THE DRAWINGS

The above and other features and advantages of inventive concepts will become more apparent by describing in detail some example embodiments of inventive concepts with reference to the attached drawings in which.

DETAILED DESCRIPTION

The term "power-gating circuit" denotes a circuit for blocking the supply of power to functional logic blocks which are classified for respective functions when operating in a sleep mode, thus reducing the power consumption of the SoC.

Figure 1:
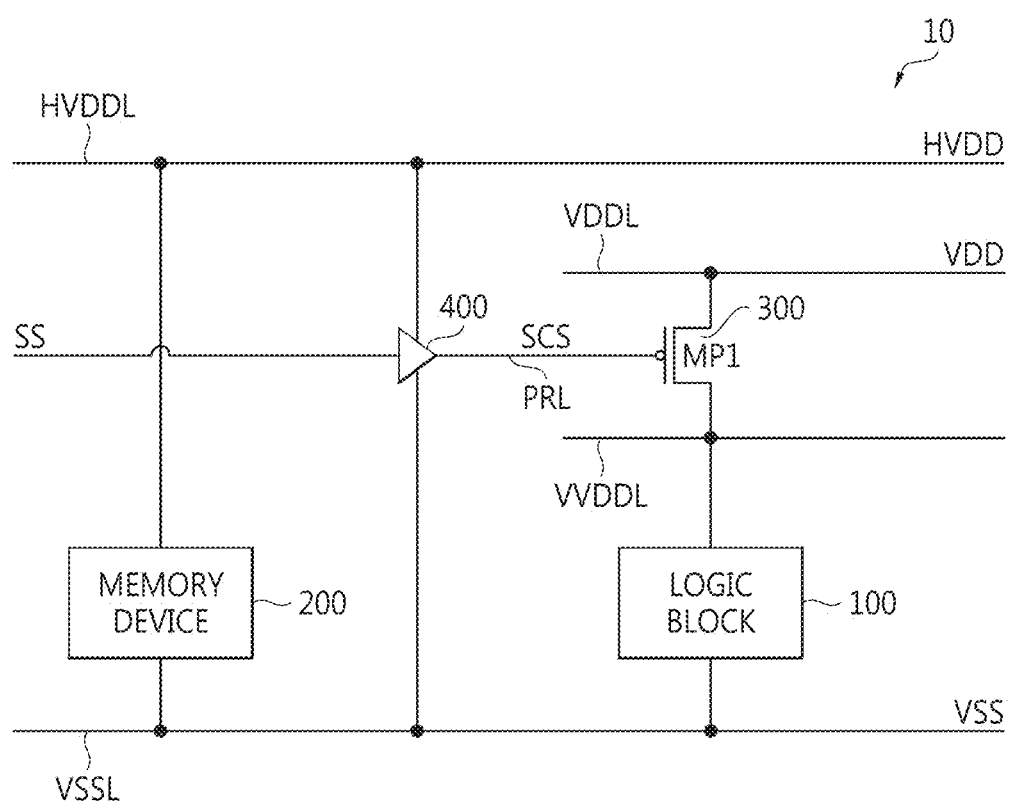
FIG. 1 is a block diagram of a semiconductor device according to some example embodiments of inventive concepts.

FIG. 1 is a block diagram illustrating a semiconductor device according to some example embodiments of inventive concepts.

A semiconductor device 10 shown in FIG. 1 may be an application processor, a media processor, a microprocessor, a central processing unit (CPU), or a device similar thereto.

Referring to FIG. 1, the semiconductor device 10 may include a logic block 100, a memory device 200, a power switch 300, and a buffer 400.

The power switch 300 may be connected between a first power line VDDL and a virtual power line VVDDL, and may be switched on or off in response to a switch control signal SCS that is transferred through a pre-routing line PRL.

The logic block 100 is connected between the virtual power line VVDDL and a ground line VSSL.

The memory device 200 is connected between a second power line HVDDL and the ground line VSSL. In some example embodiments, the memory device 200 may be a device for storing data, such as static random access memory (SRAM), dynamic random access memory (DRAM), or read only memory (ROM). Further, the second power line HVDDL, which is a line for supplying a voltage required for the operation of the memory device 200, may be referred to as a 'memory voltage line'. Unlike shown in FIG. 1, according to some example embodiments, the second power line HVDDL may be provided so as to perform a stable super cut-off operation even if the memory device 200 is not present.

The buffer 400 is connected between the second power line HVDDL and the ground line VSSL and is configured to generate the switch control signal SCS in response to a sleep signal SS. For example, the buffer 400 may generate the switch control signal SCS by buffering the sleep signal SS.

A first supply voltage VDD may be applied to the first power line VDDL, and a second supply voltage HVDD, which is higher than the first supply voltage VDD, may be applied to the second power line HVDDL. Further, a ground voltage VSS may be applied to the ground line VSSL.

In some example embodiments, when the sleep signal SS has a first logic level, the buffer 400 may supply the second supply voltage HVDD, as the switch control signal SCS, to the power switch 300, whereas when the sleep signal SS has a second logic level, the buffer 400 may supply the ground voltage VSS, as the switch control signal SCS, to the power switch 300.

The power switch 300 may selectively connect the first power line VDDL to the virtual power line VVDDL in response to the switch control signal SCS.

The logic block 100 may be selectively supplied with power through the virtual power line VVDDL. That is, the logic block 100 may be supplied with power while the power switch 300 is turned on and then the first power line VDDL is connected to the virtual power line VVDDL, and the logic block 100 may not be supplied with power while the power switch 300 is turned off and then the first power line VDDL is disconnected from the virtual power line VVDDL.

Meanwhile, the logic block 100 may include an arbitrary circuit connected to the virtual power line VVDDL. In some example embodiments, the logic block 100 may include standard cells formed using a complementary metal-oxide semiconductor (CMOS) standard cell process. For example, the logic block 100 may include at least one of an inverter, a NAND gate, an AND gate, a NOR gate, an OR gate, an exclusive OR (XOR) gate, an XNOR gate, a multiplexer, an adder, a latch, and a flip-flop, each of which is implemented using standard cells.

As described above, since the buffer 400 and the power switch 300 may selectively connect the first power line VDDL to the virtual power line VVDDL based on the logic level of the sleep signal SS, the buffer 400 and the power switch 300 may function as a power-gating circuit which selectively supplies power to the logic block 100 based on the logic level of the sleep signal SS.

In some example embodiments, the power switch 300 may be implemented as a first PMOS transistor MP1 having a source connected to the first power line VDDL, a drain connected to the virtual power line VVDDL, and a gate configured to receive the switch control signal SCS. Meanwhile, although the power switch 300 is illustrated as including a single PMOS transistor MP1 connected between the first power line VDDL and the virtual power line VVDDL in FIG. 1, the power switch 300 may include a plurality of PMOS transistors connected between the first power line VDDL and the virtual power line VVDDL according to other example embodiments.

The sleep signal SS may have a first logic level in a sleep mode, in which the logic block 100 is deactivated, and may have a second logic level in a normal operation mode, in which the logic block 100 is activated.

In the normal operation mode in which the sleep signal SS has the second logic level, the buffer 400 may supply the ground voltage VSS, as the switch control signal SCS, to the gate of the first PMOS transistor MP1. Therefore, the first PMOS transistor MP1 is turned on in response to the switch control signal SCS to connect the first power line VDDL to the virtual power line VVDDL, and thus the logic block 100 may be supplied with power from the first power line VDDL to perform a normal operation.

In contrast, in the sleep mode in which the sleep signal SS has the first logic level, the buffer 400 may provide the second supply voltage HVDD, as the switch control signal SCS, to the gate of the first PMOS transistor MP1 through the pre-routing line PRL. Therefore, the first PMOS transistor MP1 may be turned off in response to the switch control signal SCS to disconnect the first power line VDDL from the virtual power line VVDDL, thus causing the logic block 100 to enter a sleep state.

Generally, even if the PMOS transistor is in a turned-off state, leakage current (e.g. sub-threshold leakage current) may flow through the PMOS transistor. Further, in the turned-off state, as a voltage difference between the gate and source of the PMOS transistor is smaller, the magnitude of the leakage current may be larger.

In a typical power-gating circuit, a voltage having the same voltage level as the supply voltage connected to the source of the power switch is applied to the gate of the power switch in the sleep mode. In this case, the power switch is turned off and then the power line is electrically isolated from the virtual power line, but leakage current may occur in the power switch.

For example, in the sleep mode, when the switch control signal SCS has the first supply voltage VDD, the first PMOS transistor MP1 is turned off, but leakage current may flow through the first PMOS transistor MP1. Therefore, even in the sleep mode, leakage current flows from the first power line VDDL into the logic block 100 through the first PMOS transistor MP1, thus causing the logic block 100 to consume power even in the sleep mode.

On the other hand, as described above, in the semiconductor device 10 according to some example embodiments of inventive concepts, the buffer 400 may provide a second supply voltage HVDD, which is higher than the first supply voltage VDD, as the switch control signal SCS, to the gate of the first PMOS transistor MP1 in the sleep mode. Therefore, since a voltage difference between the gate and source of the first PMOS transistor MP1 corresponds to a difference between the second supply voltage HVDD and the first supply voltage VDD, leakage current flowing through the first PMOS transistor MP1 may be reduced in the sleep mode. As a result, the semiconductor device 10 according to some example embodiments of inventive concepts may effectively reduce power consumption in the sleep mode.

Further, since the buffer 400 is connected to the second power line HVDDL to which the second supply voltage HVDD, which is higher than the first supply voltage VDD, is applied, the buffer 400 may apply the second supply voltage HVDD, which is higher than the first supply voltage VDD applied to the source of the first PMOS transistor MP1, to the gate of the first PMOS transistor MP1 in response to the sleep signal SS using a buffer element having an isolated n-well, without requiring a separate level shifter. Therefore, the semiconductor device 10 according to some example embodiments of inventive concepts may be implemented so as to have a size smaller than that of a system-on-chip (SOC) including a level shifter.

Figure 2:
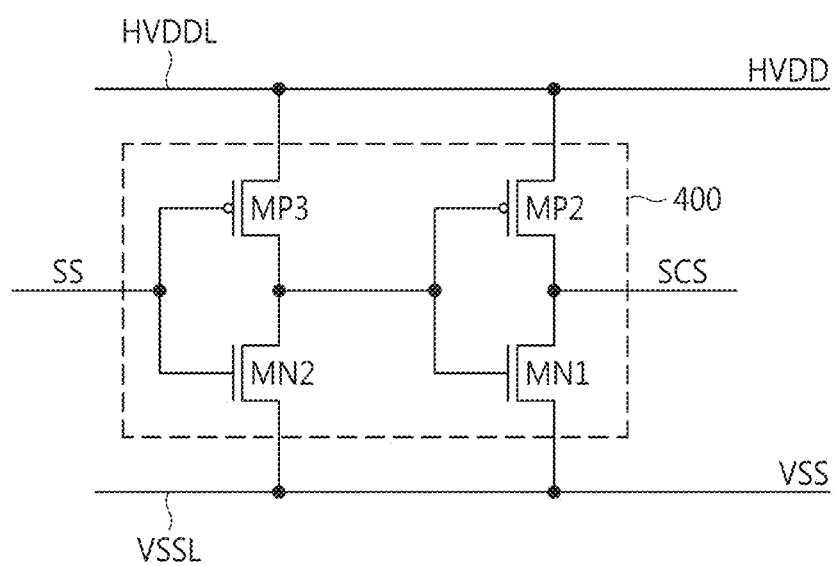
FIG. 2 is a circuit diagram illustrating the configuration of a buffer included in a semiconductor device according to some example embodiments of inventive concepts.

FIG. 2 is a circuit diagram illustrating the configuration of the buffer included in the semiconductor device according to some example embodiments of inventive concepts.

Referring to FIG. 2, the buffer 400 may include a second PMOS transistor MP2, a third PMOS transistor MP3, a first NMOS transistor MN1, and a second NMOS transistor MN2.

The second PMOS transistor MP2 may have a source connected to a second power line HVDDL, a drain connected to the gate of the first PMOS transistor MP1, and a gate connected to both the drain of the third PMOS transistor MP3 and the drain of the second NMOS transistor MN2.

The first NMOS transistor MN1 may include a source connected to a ground line VSSL, a drain connected to the gate of the first PMOS transistor MP1, and a gate connected to both the drain of the third PMOS transistor MP3 and the drain of the second NMOS transistor MN2.

The third PMOS transistor MP3 may include a source connected to the second power line HVDDL, a drain connected to the gate of the second PMOS transistor MP2 and the gate of the first NMOS transistor MN1, and a gate configured to receive a sleep signal SS.

The second NMOS transistor MN2 may include a source connected to the ground line VSSL, a drain connected to both the gate of the second PMOS transistor MP2 and the gate of the first NMOS transistor MN1, and a gate configured to receive the sleep signal SS.

The buffer 400 may output the switch control signal SCS through the drain of the second PMOS transistor MP2 and the drain of the first NMOS transistor MN1.

As shown in FIG. 2, the second PMOS transistor MP2 and the first NMOS transistor MN1 form a first inverter, and the third PMOS transistor MP3 and the second NMOS transistor MN2 may form a second inverter.

Therefore, when the sleep signal SS has a logic high level, the buffer 400 may provide the second supply voltage HVDD, as the switch control signal SCS, to the gate of the first PMOS transistor MP1, whereas when the sleep signal SS has a logic low level, the buffer 400 may provide the ground voltage VSS, as the switch control signal SCS, to the gate of the first PMOS transistor MP1.

Although the buffer 400 is illustrated as including two inverters in FIG. 2, the buffer 400 may include an arbitrary number of inverters (and/or different number of inventers than 2) according to other example embodiments.

Unlike the configuration shown in FIG. 2, when the second PMOS transistor MP2, the third PMOS transistor MP3, and the first PMOS transistor MP1 are connected in common to the first power line VDDL, the first PMOS transistor MP1, the second PMOS transistor MP2, and the third PMOS transistor MP3 may be formed in the same well.

However, as shown in FIG. 2, when the first PMOS transistor MP1 is connected to the first power line VDDL and the second PMOS transistor MP2 and the third PMOS transistor MP3 are connected to the second power line HVDDL, the well in which the first PMOS transistor MP1 is formed must be isolated from the well in which the second PMOS transistor MP2 and the third PMOS transistor MP3 are formed.

The buffer 400 shown in FIG. 2 is only an example of the buffer 400 included in the semiconductor device 10 of FIG. 1, but inventive concepts are not limited to this example. The buffer 400 may be implemented in any of various structures capable of generating the switch control signal SCS having the ground voltage VSS or the second supply voltage HVDD in response to the sleep signal SS.

Figure 3:
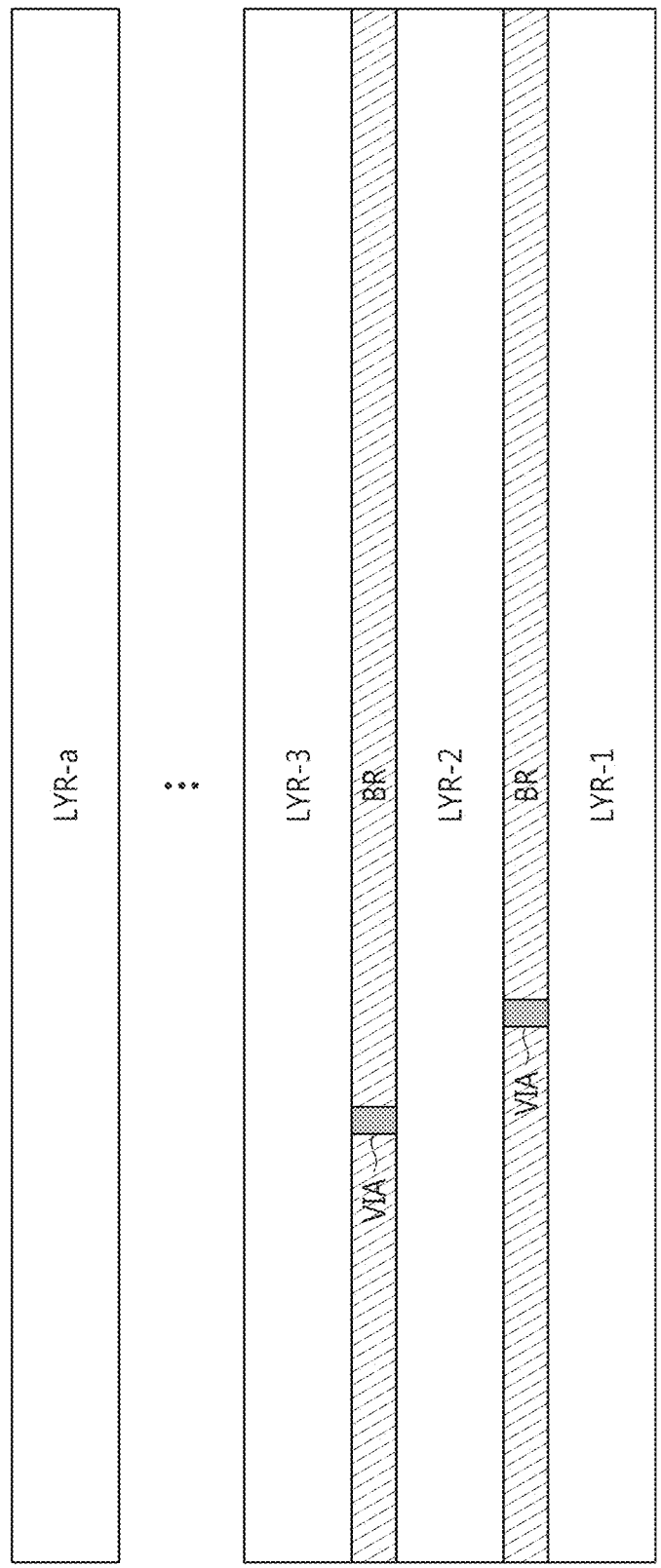
FIG. 3 is a block diagram illustrating the layout of a semiconductor device according to some example embodiments of inventive concepts.

FIG. 3 is a block diagram illustrating the layout of a semiconductor device according to some example embodiments of inventive concepts. Referring to FIG. 3, the layout of the semiconductor device 10 shown in FIG. 1 may include a plurality of layers LYR-1 to LYR-a (where 'a' is a natural number of 4 or more).

Each of the layers LYR-1 to LYR-a may include a plurality of lines, which may be electrically connected to each other through vias. Unlike the configuration shown in FIG. 3, insulators formed in regions BR between the layers LYR-1 to LYR-a may include a plurality of vias.

A plurality of signal lines may be included in the plurality of layers LYR-1 to LYR-a, and insulators may be formed in the respective regions BR between the layers LYR-1 to LYR-a. However, inventive concepts are not limited to this configuration.

Based on the layout shown in FIG. 3, the semiconductor device 10 shown in FIG. 1 may be manufactured through a fabrication process. The fabrication process may include performing a plurality of semiconductor manufacturing processes (e.g., etch, patterning, deposition, CMP, etc.) to prepare one or more semiconductor device structures on a semiconductor substrate (e.g., semiconductor wafer), based on the layout of the semiconductor device.

Figure 4:
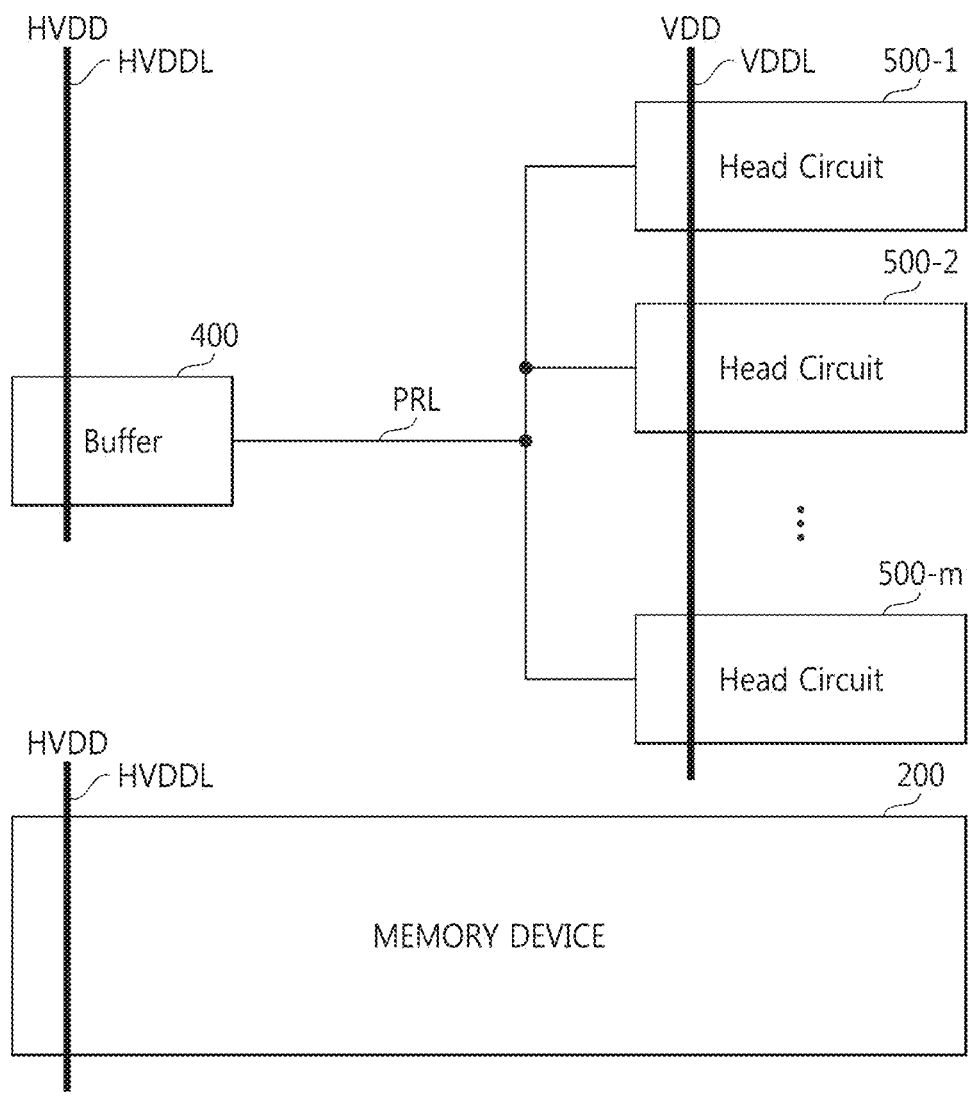
FIG. 4 is a block diagram illustrating the configuration of a semiconductor device having a multi-fanout structure according to a comparative example.

FIG. 4 is a block diagram illustrating the configuration of a semiconductor device having a multi-fanout structure according to a comparative example.

Referring to FIGS. 1 and 4, the buffer 400 may be connected to the second power line HVDDL and may then be supplied with the second supply voltage HVDD. The buffer 400 may be connected to a plurality of head circuits 500-1 to 500-m (where m is a natural number of 3 or more) through the pre-routing line PRL. As described above, the buffer 400 may control the operation of turning on/off the power of the head circuits 500-1 to 500-m. This structure is called a multi-fanout structure.

The head circuits 500-1 to 500-m may be connected to the first power line VDDL and may then be supplied with the first supply voltage VDD.

The head circuits shown in FIG. 4 may be the buffer 400 having an isolated well region, as described above with reference to FIG. 2, and the power switch 300. However, inventive concepts are not limited to this configuration, and the head circuits may be circuits in which the power switch 300 and the logic block 100 are combined with each other.

In this regard, the memory device 200 may be connected to the second power line HVDDL and may then be supplied with the second supply voltage HVDD. However, FIG. 4 illustrates the configuration of a semiconductor device having a multi-fanout structure according to the comparative example. In this case, since the second power line HVDDL connected to the memory device 200 is drawn based on a rule differing from that of the second power line HVDDL connected to the buffer 400, the second power line HVDDL above the buffer 400 and the second power line HVDDL above the memory device 200 are not directly connected in a lower layer, in which a power supply mesh is present, in most cases.

Unless a sufficient well region is secured in the power supply mesh above the buffer 400, the buffer 400 may be vulnerable to an antenna effect. Therefore, as described with reference to FIG. 4, in the buffer 400 that uses the second power line HVDDL, a power supply mesh arranged in a lower layer does not sufficiently share a well region capable of limiting and/or preventing an antenna effect, thus causing a well region connected from a specific layer to be relatively narrowed. Therefore, a problem may arise in that, in the elements (e.g. transistors) included in the buffer 400, a gate oxide breaks down due to the antenna effect. A detailed description of the antenna effect will be made in detail later.

Figure 5:
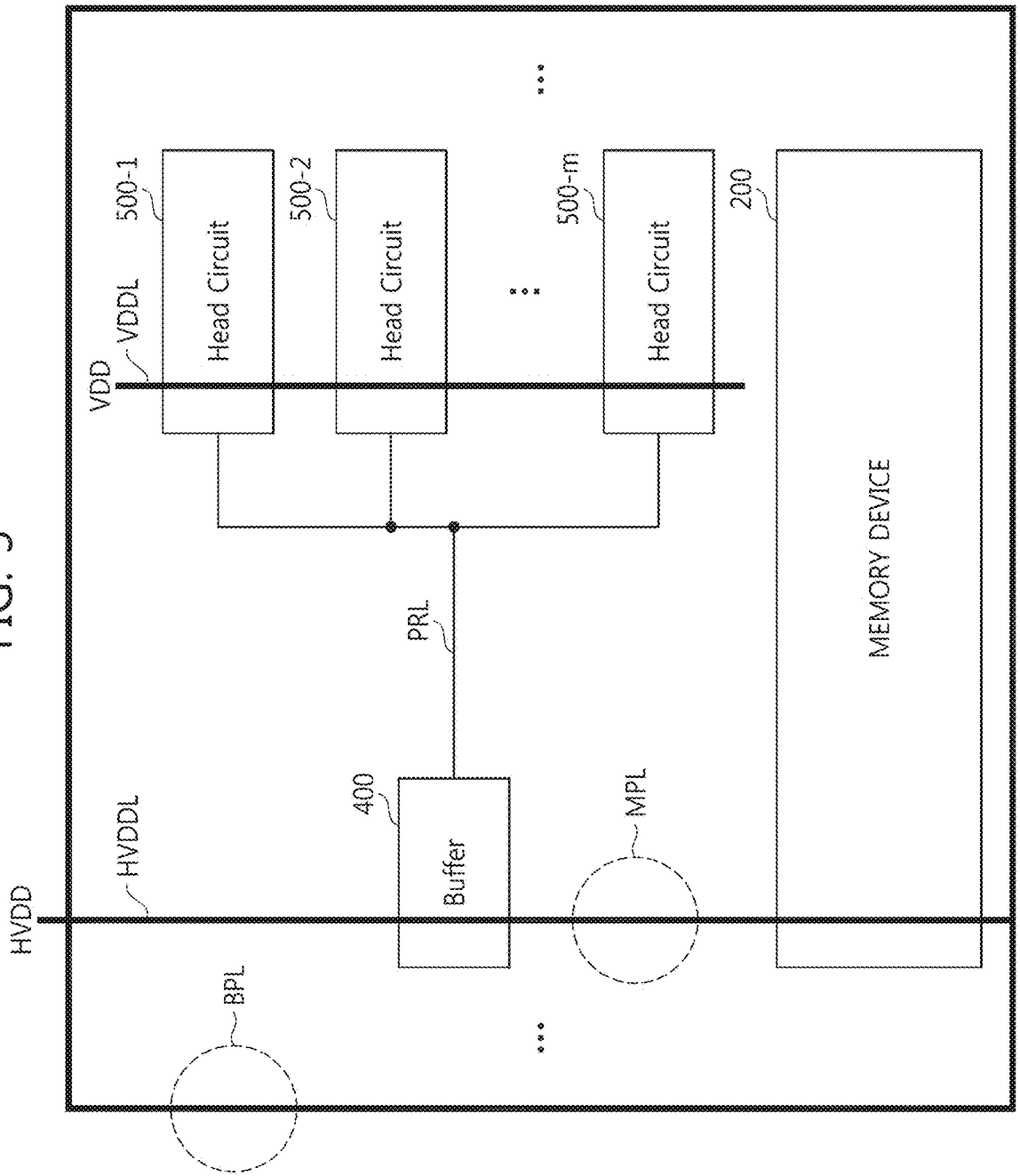
FIG. 5 is a block diagram illustrating the configuration of a semiconductor device having a multi-fanout structure according to some example embodiments of inventive concepts.

FIG. 5 is a block diagram illustrating the configuration of a semiconductor device having a multi-fanout structure according to some example embodiments of inventive concepts.

To avoid the repetition of the same description, a description will be made based on differences from the configuration of the semiconductor device shown in FIG. 4.

Referring to FIG. 5, the second power line HVDDL connected to the memory device 200 may be directly coupled to a buffer 400. In this case, the second power line HVDDL, connected simultaneously both to the memory device 200 and to the buffer 400, will be hereinafter referred to as a 'main power line MPL'.

According to some example embodiments, the second power line HVDDL connected to the memory device 200 may be directly coupled to the buffer 400 via power mesh swapping. "Power mesh swapping" may denote the operation of changing the locations of a plurality of power lines connected to the memory device 200. The second power line HVDDL connected to the memory device 200 and the second power line HVDDL connected to the buffer may be coupled to each other while occupying the same layer.

Also, referring to FIGS. 1 and 5, the second power line HVDDL, that is, a boundary power line BPL, may be formed on the edge of the functional block of the semiconductor device 10 shown in FIG. 5. According to some example embodiments, referring to FIGS. 3 and 5, when the second power line HVDDL connected to the buffer 400 and to the memory device 200 is formed in a b-th layer LYR-b, the boundary power line BPL may be formed in a b–1-th layer LYR-(b–1). Further, the boundary power line BPL has a stepped connection relationship with the well region of the memory device 200, and thus the breakdown of a gate oxide attributable to an antenna effect that may occur above the buffer 400 may be reduced and/or completely eliminated.

Figure 6A:
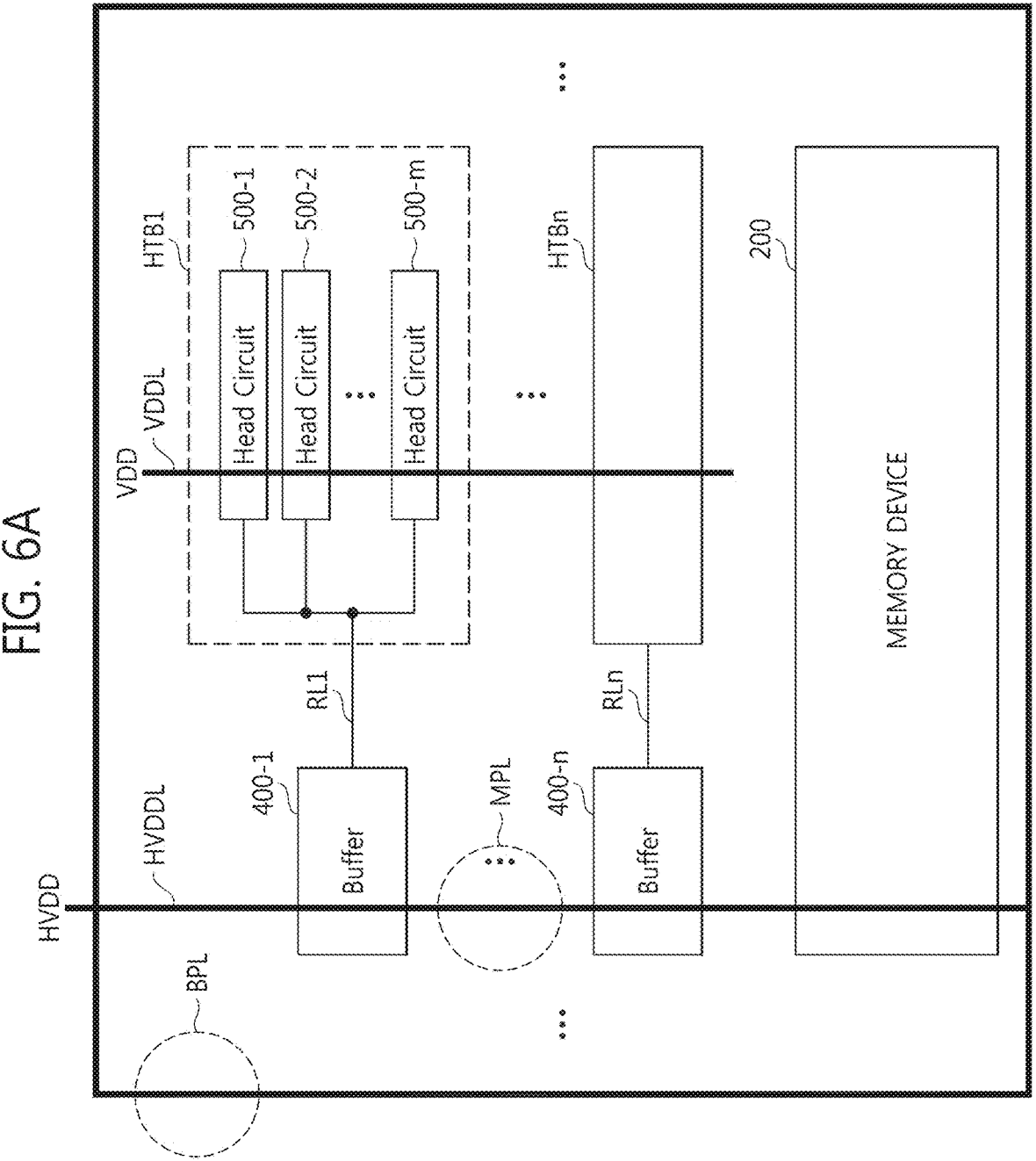
FIG. 6A is a block diagram illustrating another example of the configuration of a semiconductor device having a multi-fanout structure according to some example embodiments of inventive concepts.

FIG. 6A is a block diagram illustrating another example of the configuration of a semiconductor device having a multi-fanout structure according to some example embodiments of inventive concepts.

To avoid repetition of the same description, the semiconductor device having the multi-fanout structure according to some example embodiments of inventive concepts shown in FIG. 6A will be described based on differences from the configuration of the semiconductor device shown in FIG. 5.

The plurality of buffers 400-1 to 400-n (where n is a natural number of 2 or more) may be connected to a plurality of head circuit blocks HTB1 to HTBn, respectively, through a plurality of routing lines RL1 to RLn.

For example, the first buffer 400-1 may be connected to the first head circuit block HTB1 through the first routing line RL1.

The first head circuit block HTB1 may include a plurality of head circuits 500-1 to 500-m (where m is a natural number of 3 or more). That is, the first buffer 400-1 may be connected to the head circuits 500-1 to 500-m through the first routing line RL1.

Although not shown in FIG. 6A, similarly to the first head circuit block HTB1, each of the head circuit blocks HTB2 to HTBn may include a plurality of head circuits 500-1 to 500-m. However, according to some example embodiments, the numbers of head circuits included in the respective head circuit blocks HTB2 to HTBn may differ from each other.

Here, referring to FIG. 1, the pre-routing line PRL shown in FIG. 1 may correspond to the plurality of routing lines RL1 to RLn shown in FIG. 6A.

Figure 6B:
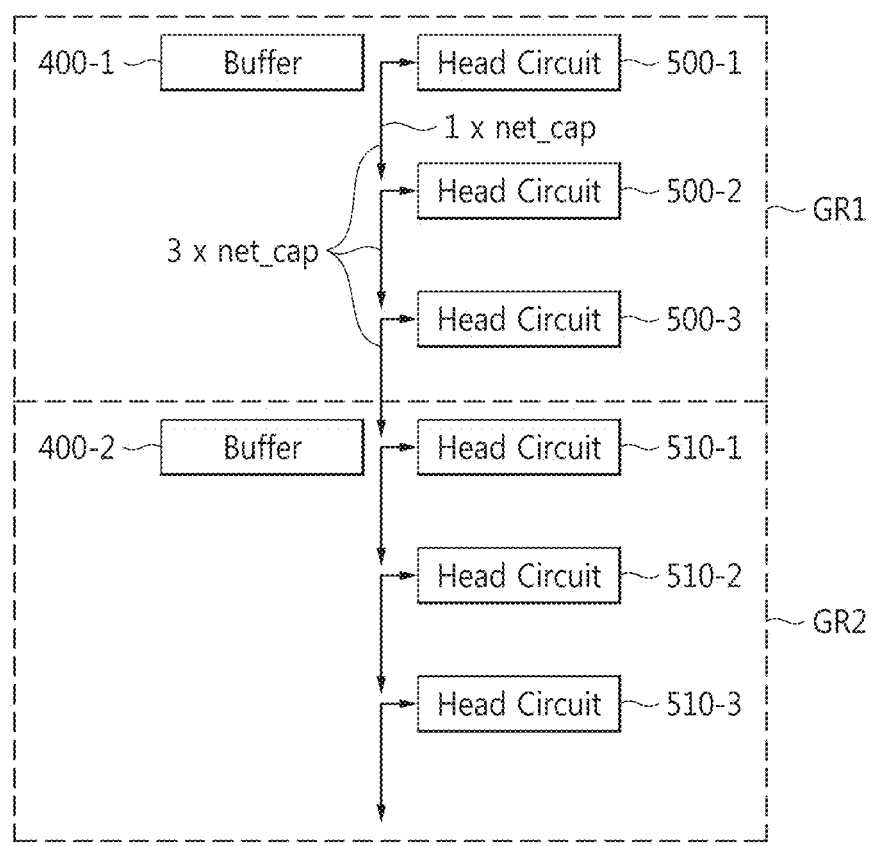
FIG. 6B is a diagram for explaining some example embodiments in which a single pattern group is formed.

FIG. 6B is a diagram for explaining some example embodiments in which a single pattern group is formed.

A method of forming an optimized pattern group GR1 in which max transition time violation (MTTV) does not occur between the first buffer 400-1 and the first head circuit block HTB1 will be described below with reference to FIGS. 6A and 6B.

The place where it is decided whether MTTV has occurred is a head circuit. That is, whether MTTV has occurred is determined based on the head circuit.

The structure of a single pattern group GR1 may be equally applied to another pattern group (e.g. GR2). Therefore, when a single optimized pattern group GR1 is created, all pattern groups may be adjusted to fall within the range in which MTTV does not occur.

MTTV occurrence values based on the input pin of the head circuit (e.g. 500-1) may be preset depending on the characteristics of the head circuit (e.g. 500-1). For example, the MTTV occurrence values based on the input pin of the head circuit (e.g. 500-1) may be configured in a table in the form of transition times depending on capacitances.

In this way, capacitance threshold values at which MTTV occurs (hereinafter referred to as "MTTV occurrence capacitance threshold values" for convenience of description) may be set based on relationships between the capacitances and the transition times, which are configured in the table.

In some example embodiments, a fanout value satisfying the following Formula may be calculated.

$$\text{MTTVcap} \geq \text{BUFcap} + (\text{HEADcap} + \text{NETcap})*\text{Fanout} + \text{Margin} \qquad (1)$$

Here, MTTVcap may denote the MTTV occurrence capacitance threshold value, BUFcap may denote the capacitance of a second buffer 400-2, HEADcap may denote the capacitance of the first head circuit 500-1, NETcap may denote the capacitance of a signal line between the first head circuit 500-1 and the second head circuit 500-2, and Fanout may denote the number of head circuits 500-*n* connected to a first buffer 400-1.

The capacitance BUFcap of the second buffer 400-2 and the capacitance HEADcap of the head circuit 500-1 may be preset depending on the characteristics of the second buffer 400-2 and the head circuit (e.g. 500-1).

The signal line capacitance NETcap may be calculated based on the length and width of the signal line.

Further, Margin is intended to reflect a capacitance component that is not included in Formula (1), and may be set to an arbitrary value.

Although the capacitance of a signal line between the first buffer 400-1 and the first head circuit 500-1 is not indicated in Formula (1), the capacitance of the signal line between the first buffer 400-1 and the first head circuit 500-1 may be added, or alternatively, Margin may be determined in consideration of the capacitance of the signal line between the first buffer 400-1 and the first head circuit 500-1, according to embodiments.

In some example embodiments, the maximum Fanout, satisfying Formula (1), may be selected. In the embodiment of FIG. 6B, a Fanout value is assumed to be '3', but inventive concepts are not limited thereto.

As described above, after the Fanout value has been set based on Formula (1), resources for the shortest routing, which may reduce and/or minimize the signal line capacitance NETcap, are searched for.

First, routing space that may be closest to the power line between the first buffer 400-1 and the first head circuit 500-1 may be searched for.

Next, capacitance values are analyzed for respective layers, and a layer for which the total capacitance is smallest is selected, and then routing may be performed on the selected layer.

A routing pattern is determined based on this criterion, thus enabling a single pattern group GR1 to be formed. The formed pattern group GR1 may also be applied to the remaining regions, for example, other pattern groups.

According to some example embodiments, in some cases, a number of remaining head circuits may be smaller than the Fanout value. For example, when the Fanout value is 3 and the number of remaining head circuits is 2, a routing pattern for the last head circuit (e.g. 500-3) is eliminated from the formed pattern group GR1, after which the pattern group may be applied.

Figure 7:
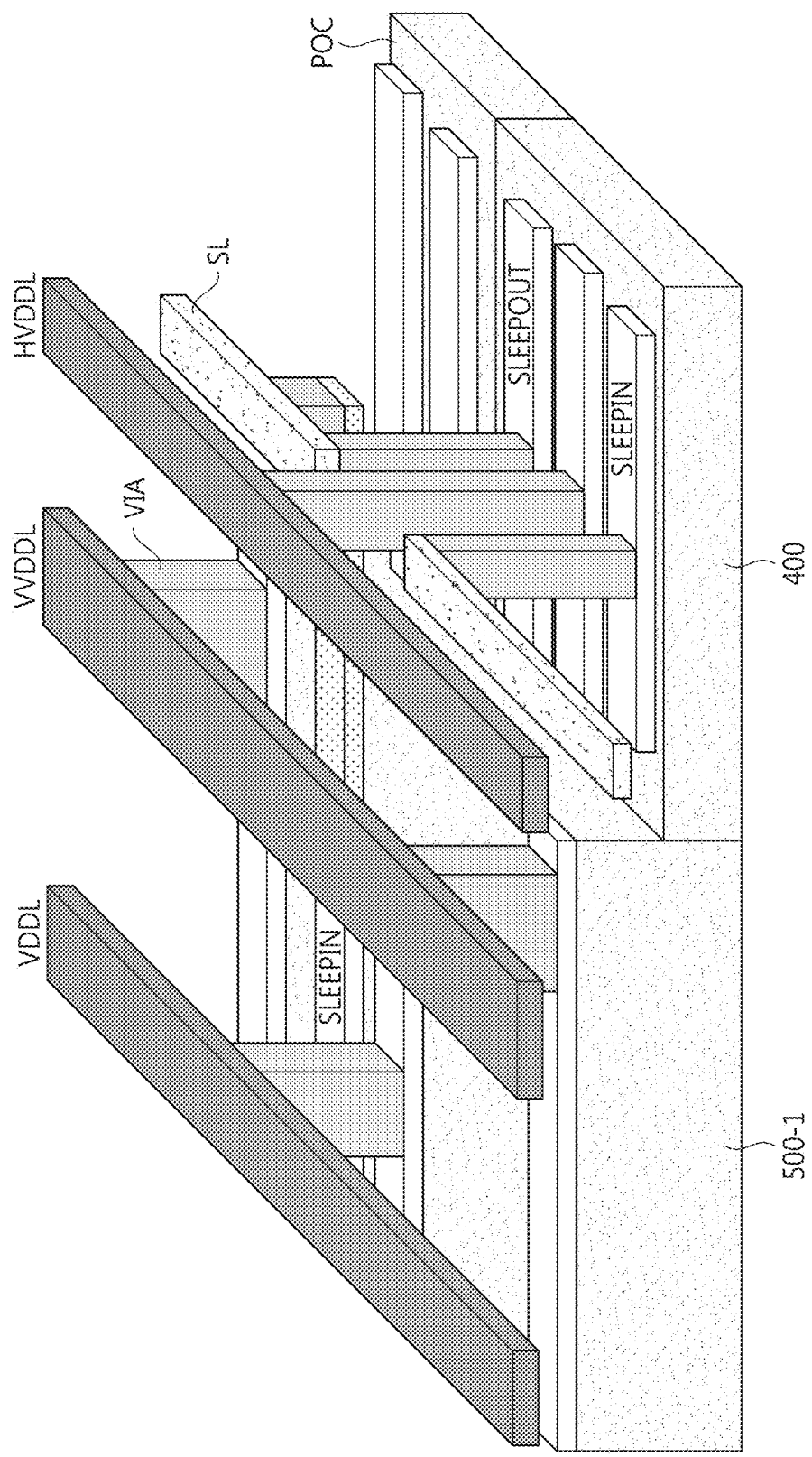
FIG. 7 is a diagram illustrating an improved layout pattern of a pre-routing line according to some example embodiments of inventive concepts.

FIG. 7 is a diagram illustrating an improved layout pattern of a pre-routing line according to some example embodiments of inventive concepts. In FIG. 7, in order to describe the improved layout pattern of the pre-routing line PRL shown in FIG. 1, only the buffer 400 and the first head circuit 500-1 are illustrated as a non-limiting example.

Referring to FIGS. 1 and 7, the buffer 400 may be connected to the second power line HVDDL through vias. As shown in FIG. 7, the second power line HVDDL may be formed in a layer differing from that of the buffer 400.

The first head circuit 500-1 may be connected to the first power line VDDL through a via, and may be connected to the virtual power line VVDDL through other vias. As shown in FIG. 7, the first power line VDDL and the virtual power line VVDDL may be formed in a layer differing from that of the first head circuit 500-1.

For example, the first power line VDDL, the virtual power line VVDDL, and the second power line HVDDL may be formed in the same layer. However, inventive concepts are not limited to this example.

The pre-routing line PRL shown in FIG. 1 may correspond to a combination of a signal line SL, a sleep out line SLEEPOUT, and a sleep in line SLEEPIN, shown in FIG. 7.

A sleep in line SLEEPIN and a sleep out line SLEEPOUT may be formed on the top of the buffer 400. Further, a sleep in line SLEEPIN may be formed on the top of the first head circuit 500-1. For example, the sleep out line SLEEPOUT formed on the top of the buffer 400 may be connected to the signal line SL through a via. The sleep in line SLEEPIN formed on the top of the first head circuit 500-1 may be connected to the signal line SL through another via.

The signal line SL may be formed in a layer including signal lines which are parallel to the directionality of the first power line VDDL and the second power line HVDDL, that is, the main power line MPL of FIG. 6A. That is, the signal line SL may be formed in a layer that differs from that of the main power line MPL, but has the same directionality as the main power line MPL and may be parallel to the main power line MPL.

Also, the layer in which the signal line SL is formed may be a layer below the layer in which the first power line VDDL and the second power line HVDDL, that is, the main power line MPL, are formed.

Referring to FIGS. 1 and 7, the signal line SL is formed in a region, which is parallel to the second power line HVDDL and is placed below the second power line HVDDL, and thus the buffer 400 may transfer a control signal to the first head circuit 500-1 or the gate of the first PMOS transistor MP1 through the shortest path.

For example, the control signal may be the switch control signal SCS shown in FIG. 1.

A wiring pattern leading to the sleep out line SLEEPOUT, the signal line SL, and the sleep in line SLEEPIN shown in FIG. 7 may be the shortest implementable path, and may be an improved layout pattern of the pre-routing line PRL. In the case of the improved layout pattern, the wiring pattern is manufactured such that a minimum number of vias are used for the wiring pattern, wiring directionality is taken into consideration, and the wiring pattern has the shortest path in order to reduce and/or minimize an MTTV effect and maximally secure a wiring region for the logic block 100.

As shown in FIG. 7, a physical-only cell (POC), that is, a decoupling (decap) cell, may be arranged in a congested region. For example, a POC is arranged in a congested region in which routing congestion may occur owing to the improved layout pattern of the pre-routing line, thus limiting and/or preventing the occurrence of congestion.

Here, the POC is a cell which has only physical information without having timing information or logical information, and denotes a cell which has power and ground pins without having signal pins.

Such a POC may include a tap cell, an end cap cell, a pad cell, and a decoupling capacitor (decap) cell. The tap cell may be a cell fixed to have a silicon structure of an n-type well and a p-type substrate. The pad cell may be a cell designated so as to interface with external devices. The decap cell may be a cell including a capacitor for overcoming a voltage drop between a power line and a ground line.

Figure 8:
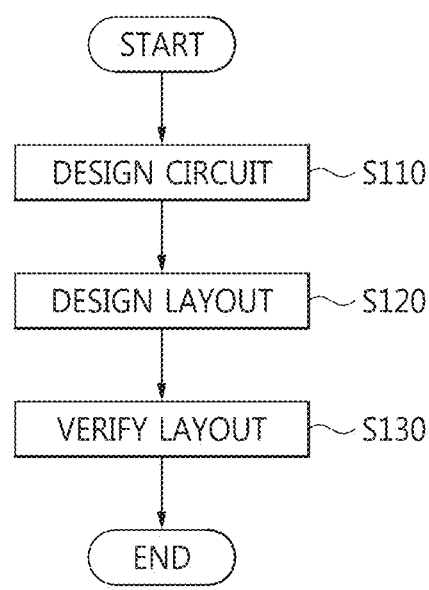
FIG. 8 is a flowchart illustrating a method of designing a semiconductor device according to some example embodiments of inventive concepts.

FIG. 8 is a flowchart illustrating a method of designing a semiconductor device according to some example embodiments of inventive concepts. Referring to FIG. 8, the semiconductor device design method according to some example embodiments of inventive concepts includes a circuit design operation S110, a layout design operation S120, and a layout verification operation S130.

First, in the circuit design operation S110, a schematic circuit may be designed. In the circuit design operation S110, a computer aided design (CAD) tool capable of representing the status of connections between circuit elements may be used. A circuit designer may use the CAD tool to design the schematic circuit in units of logic blocks for performing specific functions. Although not clearly illustrated in FIG. 8, the circuit design operation S110 may further include the operation of simulating the operations of the designed schematic circuit.

Then, in the layout design operation S120, a layout corresponding to the designed schematic circuit may be designed. A detailed description related to S120 will be made later with reference to FIG. 9. Further, the layout may include (or be composed of) a plurality of layers.

In the layout verification operation S130, verification such as design rule check (DRC) verification or layout versus schematic (LVS) verification may be performed on the designed layout. That is, whether the designed layout satisfies the design rule of a manufacturing process may be verified. For example, it may be verified whether various problems, such as a max transition time violation (MTTV) problem indicating whether the transition time required to reach a stable voltage exceeds a time limit, problems related to shorts in wiring, and the problem of an antenna effect by which a gate oxide may break down due to the transition of electrons from a metal layer to an element gate during a plasma process, have occurred in the layout.

Further, whether the designed layout corresponds to the schematic circuit may be verified. Although not clearly illustrated in FIG. 8, post-simulation may be performed in the layout verification operation S130.

Figure 9:
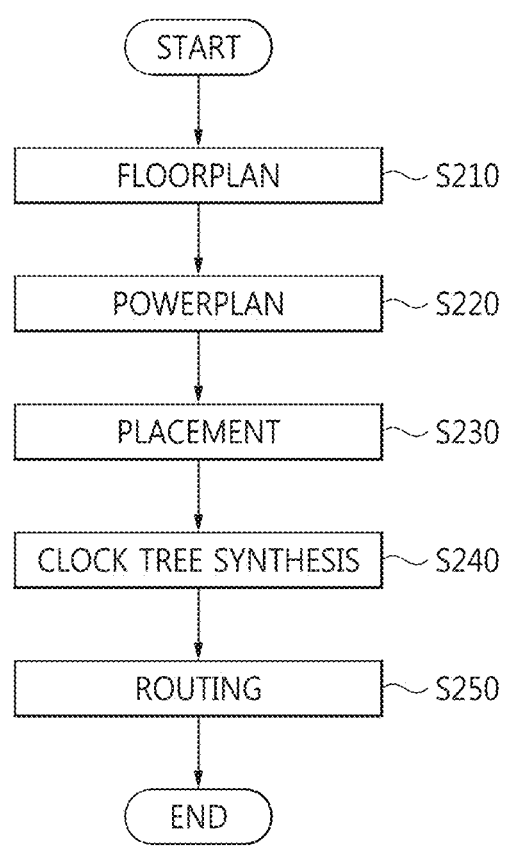
FIG. 9 is a flowchart illustrating in detail a layout design operation according to some example embodiments of inventive concepts.

FIG. 9 is a flowchart illustrating in detail the layout design operation according to some example embodiments of inventive concepts.

A method of designing the layout of a schematic circuit may be implemented using a customization method by which a designer personally and manually arranges/designs elements or using a method based on electronic design automation (hereinafter referred to as "EDA"). Below, a description will be restrictively made with respect to only the operation of designing the layout of the semiconductor device using EDA.

Referring to FIG. 9, the layout design operation (S120 of FIG. 8) may include a floorplan operation S210, a powerplan operation S220, a placement operation S230, a clock tree synthesis (CTS) operation S240, and a routing operation S250.

The floorplan operation S210 may denote an operation of cutting and shifting a logically designed schematic circuit and then physically designing the circuit, that is, the operation of generating a layout pattern of memory or functional blocks for actual fabrication.

The powerplan operation S220 may denote the operation of generating a layout pattern of wires (e.g., a wiring layout pattern) for connecting local power (e.g. a driving voltage) or a ground to the arranged functional blocks. For example, a wiring layout pattern for connecting power or a ground may be generated in the form of a mesh such that power may be uniformly supplied to the entire chip. In this regard, all patterns may be formed in the form of a mesh based on various rules. For this, the second power supply lines may be directly connected to each other above the buffer 400 and the memory 200 by separately establishing a special swapping rule, and wiring up to the well region of the memory may be performed in a stepped form so as to eliminate an antenna effect from the second power supply lines.

The powerplan operation S220 according to some example embodiments of inventive concepts may include the operation of additionally generating a layout pattern of signal lines (hereinafter referred to as 'pre-routing lines') associated with power ON/OFF operation related to power gating. Details related to this operation will be described later with reference to FIG. 10.

The placement operation S230 may denote the operation of generating a placement pattern of elements constituting each functional block.

The CTS operation S240 may denote the operation of generating a layout pattern of signal lines for a central clock related to a response time for determining the performance of the semiconductor device.

The routing operation S250 may denote the operation of generating a layout pattern of normal signal lines. The term "normal signal lines" may denote signal lines for transmitting normal control signals, input signals or output signals, rather than pre-routing lines.

Figure 10:
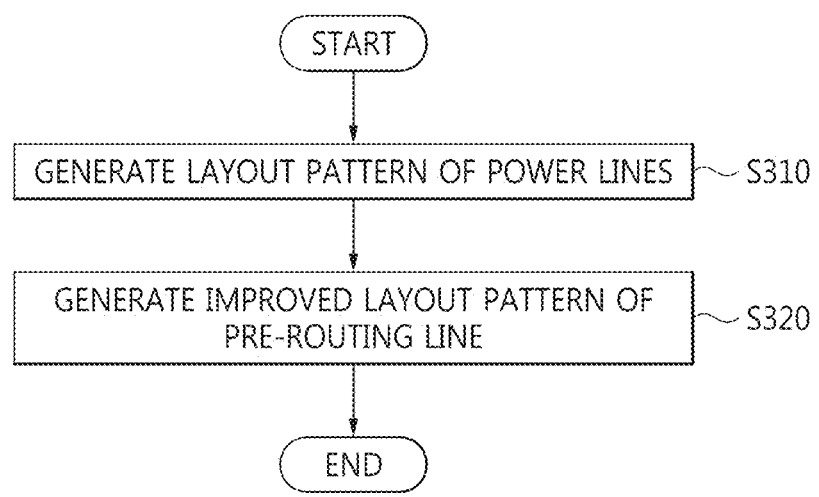
FIG. 10 is a flowchart illustrating in detail a powerplan operation according to some example embodiments of inventive concepts.

FIG. 10 is a flowchart illustrating in detail the powerplan operation according to some example embodiments of inventive concepts.

Referring to FIG. 10, the powerplan operation S220 shown in FIG. 9 may include the operation S310 of generating the layout pattern of wires connected to power and/or the ground (hereinafter referred to as 'power lines') and the operation S320 of generating an improved layout pattern of signal lines associated with power ON/OFF operation related to power gating.

As described above, the operation S310 of generating the layout pattern of the power lines may denote the operation of generating a layout pattern of power lines to be connected to typical driving voltages (e.g. memory voltages, block driving voltages VDD and VSS, etc.) and/or power lines to be connected to the ground.

The operation S320 of generating the improved layout pattern of pre-routing lines may denote the operation of generating the layout pattern of signal lines associated with power ON/OFF operation related to power gating.

The term "power gating" denotes technology in which, when a semiconductor device is operated in a sleep mode, the power consumption of a system-on-chip may be reduced by blocking the supply of power to the logic block of the semiconductor device.

Generally, the layout pattern of signal lines associated with power ON/OFF operation related to power gating may be generated in the routing operation S250 shown in FIG. 9.

However, when the layout pattern of the pre-routing lines is generated later than the layout pattern of the central clock and normal signal lines, priority for occupation of power signal lines related to power gating is postponed, so that wiring is performed to be detoured from a start point to an end point, thus resulting in time delays and wiring congestion.

This may cause fatal problems (e.g. max transition time violation (MTTV) and an antenna effect) on a power-gating circuit to which super cut-off and multi-fanout technology are applied.

The term "super cut-off technology" denotes technology for supplying a memory voltage having a relatively stable and high value to a PMOS transistor forming a power cut-off switch in order to reduce leakage current that may occur on a power cut-off switch for a logic block even in a sleep mode.

The term "antenna effect" denotes plasma-induced gate oxide damage, and more specifically means a phenomenon in which a gate oxide breaks down due to the transition of electrons from a metal layer to an element gate. Such an antenna effect may occur more frequently on a power-gating circuit to which super cut-off technology is applied.

Further, the term "multi-fanout" denotes a structure in which a control circuit (e.g. a buffer) and a plurality of header cells are connected to each other such that a single control circuit may control the plurality of header cells in order to reduce and/or minimize leakage current and efficiently use physical resources.

The term "MTTV problem" denotes a phenomenon in which a transition time required for a stable voltage to reach a power cut-off switch or a header cell from the control circuit (e.g. the buffer) exceeds a limit value. The MTTV problem may be caused by the complexity of wiring and the increased length of wiring, resulting from the multi-fanout structure.

As the solution to the above-described MTTV and antenna effect, a method of designing a semiconductor device according to the example embodiments of inventive concepts may be proposed.

That is, the improved layout pattern of the pre-routing lines may be generated in the powerplan operation S220, rather than in the routing operation S250 shown in FIG. 9, and thus the layout pattern of the pre-routing lines may be generated so as to efficiently use resources (e.g. spaces or paths).

According to some example embodiments of inventive concepts, the improved layout pattern of pre-routing lines may be patterns determined based on preset patterns or various design rules.

For example, when the improved layout pattern of pre-routing lines is a preset pattern, the improved layout pattern may be the pattern that has the shortest wiring path and has similar wiring directionality for respective layers.

When the improved layout pattern of pre-routing lines is determined based on various design rules, the improved layout pattern may be determined to have the shortest wiring path and have similar wiring directionality for respective layers.

Figure 11:
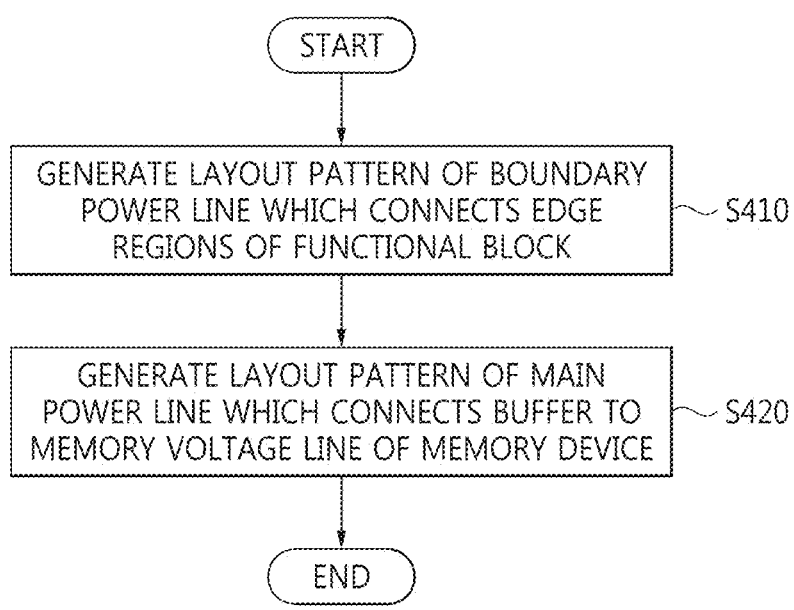
FIG. 11 is a flowchart illustrating in detail the operation of generating a layout pattern of power lines according to some example embodiments of inventive concepts.

FIG. 11 is a flowchart illustrating in detail the operation of generating a layout pattern of power lines according to some example embodiments of inventive concepts.

Referring to FIG. 11, the operation S310 of generating the layout pattern of power lines, shown in FIG. 10, may include the operation S410 of generating a layout pattern of a boundary power line BPL which connects edge regions of each functional block, and the operation S420 of generating a layout pattern of a main power line MPL which connects a buffer to the memory voltage line of a memory device.

The operation S410 of generating the layout pattern of the boundary power line BPL may denote the operation of connecting a power line to a marginal space, that is, an edge portion, which is set to isolate power from other functional blocks. For example, when the main power line MPL is arranged in a b-th layer (where b is a natural number of 2 or more), the boundary power line BPL may be arranged in a b−1-th layer. Further, the boundary power line BPL may be connected to a well region of the memory in a stepped form.

In order to limit and/or prevent the occurrence of an antenna effect, the boundary power line BPL may be hierarchically arranged in a layer lower than that of the main power line MPL by one level to form a buffer zone for protecting the gate insulator of each element, as described above.

The operation S420 of generating the layout pattern of the main power line MPL which connects the buffer to the memory voltage line of the memory device 200 may be configured to generate a layout pattern of the main power line MPL which connects the memory voltage line of the memory device 200 to the buffer 400 so that memory voltage is supplied to the buffer 400 as super cut-off technology is applied to the semiconductor device.

According to some example embodiments of inventive concepts, the buffer 400 may be connected to the memory voltage line of the memory device through power mesh swapping.

A power mesh is a mesh including (or composed of) power lines.

Figure 12:
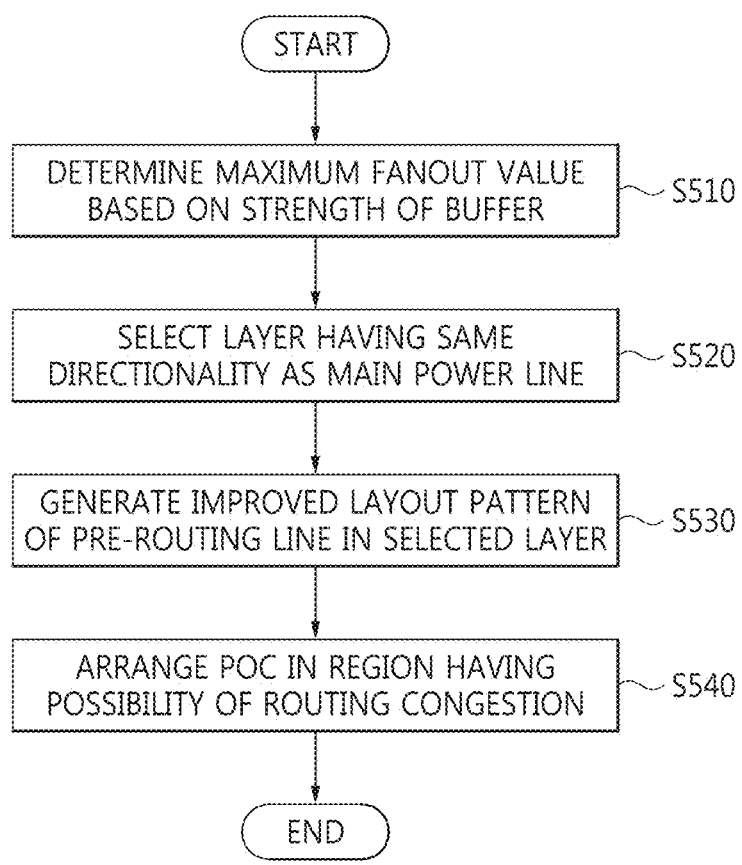
FIG. 12 is a flowchart illustrating in detail the operation of generating an improved layout pattern of a pre-routing line according to some example embodiments of inventive concepts.

FIG. 12 is a flowchart illustrating in detail the operation of generating the improved layout pattern of pre-routing lines according to some example embodiments of inventive concepts.

Referring to FIG. 12, the operation S320 of generating the improved layout pattern of pre-routing lines, shown in FIG. 10, may include the operation S510 of determining the maximum fanout value based on the strength of the buffer 400, the operation S520 of selecting a layer having the same directionality as the main power line MPL, an operation S530 of generating an improved layout pattern of pre-routing lines in the selected layer, and the operation S540 of generating a pattern in which a physical-only cell (POC) is arranged in advance in a congested region, which may be formed in a layer in which a metal layer and functional elements are shared.

In each layer, conducting wires having various directions may be included, but the directionality of the majority of the conducting wires may mean the directionality of the corresponding layer. However, inventive concepts are not limited to this example. For example, the directionality of the main power line MPL may mean the directionality of the corresponding layer.

The operation S510 of determining the maximum fanout value based on the strength of the buffer may denote the operation of determining the maximum number of head circuits that may be connected to a single buffer depending on the strength of the buffer. For example, when the maximum number of head circuits that may be connected to a single buffer is 5, the maximum fanout value may be determined to be 5.

In some example embodiments, in operation S510, the maximum fanout value may be determined based on Formula (1), as described above with reference to FIG. 6B.

The operation S520 of selecting the layer having the same directionality as the main power line MPL may denote the operation of selecting a layer having the same direction as the main power line MPL from among a plurality of layers, and the selected layer may be, for example, a layer below the layer including the main power line MPL.

The operation S530 of generating the improved layout pattern of pre-routing lines in the selected layer may denote the operation of generating the above-described improved layout pattern of pre-routing lines in a region below the main power line MPL, according to some example embodiments.

The operation S540 of generating the pattern in which the POC is arranged in advance in the congested region may denote the operation of arranging a POC in a congested region in which routing congestion may occur due to the improved layout pattern of pre-routing lines, thus limiting and/or preventing wiring congestion from occurring in a layer in which wires and functional elements are shared.

Here, the physical only cell (POC) is a cell which has only physical information without having timing information or logical information, and denotes a cell which has power and ground pins without having signal pins.

Such a POC may include a tap cell, a pad cell, and a decap cell.

The method of designing a semiconductor device according to some example embodiments of inventive concepts is advantageous in that super cut-off technology may be applied even to small-sized semiconductor devices, and an MTTV problem and the problem of gate oxide breakdown caused by an antenna effect may be effectively reduced in a power-gating circuit having a multi-fanout structure.

While some example embodiments of inventive concept have been particularly shown and described, it will be understood by those of ordinary skill in the art that various changes in forms and details may be made therein without departing from the spirit and scope of inventive concepts as defined by the following claims.

What is claimed is:

1. A method of designing a semiconductor device including a memory device, a buffer, and a plurality of head circuits connected to the buffer, the method comprising:
    generating a layout pattern of a power line of the semiconductor device;
    generating an improved layout pattern of a pre-routing line, the pre-routing line connecting the buffer to the plurality of head circuits; and
    in response to generating of the improved layout pattern of the pre-routing line, generating a layout pattern of signal lines of the semiconductor device,
    the signal lines including normal signal lines and signal lines for a central clock related to a response time for determining performance of the semiconductor device,
    wherein a layout of the semiconductor device includes a plurality of layers.

2. The method of claim 1, wherein the generating the layout pattern of the power line includes:
    generating a layout pattern of a boundary power line that connects an edge region of a functional block; and
    generating a layout pattern of a main power line that connects the buffer to a memory voltage line of the memory device.

3. The method of claim 2, wherein
    the generating the layout pattern of the power line includes forming a memory voltage line in a b-th layer among the plurality of layers of the layout of the semiconductor device, and
    the generating the layout pattern of the boundary power line includes forming the boundary power line in a b−1-th layer among the plurality of layers of the layout of the semiconductor device when the memory voltage line is formed in the b-th layer.

4. The method of claim 1, wherein
    the generating the improved layout pattern of the pre-routing line includes determining a maximum fanout value based on a strength of the buffer, selecting one layer from among the plurality of layers of the layout of the semiconductor device, and generating the improved layout pattern of the pre-routing line in the selected layer, and
    the maximum fanout value denotes a number of the plurality of head circuits connected to the buffer.

5. The method of claim 4, wherein the improved layout pattern of the pre-routing line is a layout pattern that is preset through repetitive application of a task command.

6. The method of claim 4, wherein
    the generating the layout pattern of the power line includes forming a memory voltage line, and
    a directionality of the selected layer is identical to a directionality of the memory voltage line.

7. The method of claim 4, wherein the selected layer is below a layer in which a memory voltage line is implemented.

8. The method of claim 4, wherein the improved layout pattern of the pre-routing line is a pattern that minimizes a sum of respective distances from the buffer to the plurality of head circuits.

9. The method of claim 4, further comprising:
    arranging a physical-only cell (POC) in a region of the layout of the semiconductor device in which routing congestion occurs, and
    the POC is a cell to which a separate signal line is not connected.

10. The method of claim 1, wherein a design method of the semiconductor device is generated using an electronic design automation (EDA) tool.

11. A method of designing a semiconductor device using an electronic design automation (EDA) tool, the method comprising:
    generating an improved layout pattern of a pre-routing line before generating a layout pattern of signal lines,
    the signal lines including normal signal lines and signal lines for a central clock of the semiconductor device,
    the semiconductor device including a plurality of head circuits and a buffer for controlling operations of the head circuits, and
    the pre-routing line connects the buffer to the plurality of head circuits.

12. The method of claim 11, wherein the generating the improved layout pattern of the pre-routing line includes:
    selecting one layer from among a plurality of layers included in a layout of the semiconductor device; and
    generating the improved layout pattern of the pre-routing line in the selected layer.

13. The method of claim 12, wherein the generating the improved layout pattern of the pre-routing line includes generating the improved layout pattern as a pattern that minimizes a sum of respective distances from the buffer to the plurality of head circuits.

14. The method of claim 12, wherein the generating the improved layout pattern of the pre-routing line includes generating the improved layout pattern such that the pre-routing line is a layout pattern that is preset through repetitive application of a task command.

15. The method of claim 11, further comprising:
    generating a layout pattern of a power line of the semiconductor device, wherein the generating the layout pattern of the power line includes generating a layout pattern of a boundary power line that connects an edge region of a functional block, and generating a layout pattern of a main power line that connects the buffer to a memory voltage line of a memory device.

16. A method of designing a layout of a semiconductor device using an electronic design automation (EDA) tool, the layout of the semiconductor device including a plurality of layers including a memory device, a buffer, a plurality of head circuits connected to the buffer, the method comprising:

generating a layout pattern of a power line of the semiconductor device;

generating an improved layout pattern of a pre-routing line, the pre-routing line connecting the buffer to the plurality of head circuits;

performing a clock tree synthesis operation that includes generating a layout pattern of signal lines for a central clock related to a response time for determining the performance of the semiconductor device; and performing a routing operation that includes generating a layout pattern of normal signal lines in the layout of the semiconductor device after the generating the improved layout pattern of the pre-routing line.

17. The method of claim 16, wherein the generating the layout pattern of the power line includes generating the layout of the power line such that a first power line and a second power line are generated, and the second power line is connected to both the buffer and the memory device, and the second power line is directly connected to the memory device.

18. The method of claim 16, wherein the generating the layout pattern of the power line includes generating a layout pattern of a boundary power line that connects an edge region of a functional block, and generating a layout pattern of a main power line that connects the buffer to a memory voltage line of the memory device, the generating the layout pattern of the power line includes forming a memory voltage line in a b-th layer among the plurality of layers of the layout of the semiconductor device, and the generating the layout pattern of the boundary power line includes forming the boundary power line in a b–1-th layer among the plurality of layers of the layout of the semiconductor device when the memory voltage line is formed in the b-th layer.

19. The method of claim 16, wherein the generating the improved layout pattern of the pre-routing line includes determining a maximum fanout value based on a strength of the buffer, selecting one layer from among the plurality of layers of the layout of the semiconductor device, and generating the improved layout pattern of the pre-routing line in the selected layer, and the maximum fanout value denotes a number of the plurality of head circuits connected to the buffer.

20. A method of manufacturing a semiconductor device, comprising:

designing the layout of the semiconductor device using the method of claim 16;

performing a fabrication process to manufacture the semiconductor device based on the layout.

* * * * *